United States Patent [19]
Hickok

[11] Patent Number: 4,723,181
[45] Date of Patent: Feb. 2, 1988

[54] TAPE MEMORY WITH INTEGRAL DISK INDEX ON REEL

[75] Inventor: William K. Hickok, Rochester, N.Y.

[73] Assignee: Eastman Kodak Company, Rochester, N.Y.

[21] Appl. No.: 911,198

[22] Filed: Sep. 24, 1986

[51] Int. Cl.$^4$ .............................................. G11B 27/32
[52] U.S. Cl. ................................... 360/72.2; 360/69; 360/132; 369/15
[58] Field of Search .............................. 360/72.1–72.2, 360/60, 74.4, 69, 132, 74.4; 369/14, 15; 364/200 MS File, 900 MS File

[56] References Cited

U.S. PATENT DOCUMENTS

| | | | |
|---|---|---|---|
| 2,611,618 | 9/1952 | Camras | 369/15 |
| 3,724,935 | 4/1973 | Batter, Jr. | 352/38 |
| 3,932,894 | 1/1976 | Arter et al. | 360/72.2 |
| 4,000,510 | 12/1976 | Cheney et al. | 360/74.2 |
| 4,001,891 | 1/1977 | Held | 360/132 |
| 4,135,058 | 1/1979 | Pfost et al. | 360/72.1 |
| 4,184,180 | 1/1980 | Barton, Jr. et al. | 360/60 |
| 4,280,136 | 7/1981 | Kashima et al. | 358/93 |
| 4,321,635 | 3/1982 | Tsuyuguchi | 360/74.4 |
| 4,338,644 | 7/1982 | Staar | 360/69 |
| 4,339,776 | 7/1982 | Länger et al. | 360/69 |
| 4,352,165 | 9/1982 | Hevenor, Jr. | 364/900 |
| 4,425,586 | 1/1984 | Miller | 358/335 |
| 4,554,599 | 11/1985 | Shiozaki | 360/69 |
| 4,641,203 | 2/1987 | Miller | 369/14 |

FOREIGN PATENT DOCUMENTS 2757589  6/1979  Fed. Rep. of Germany ........ 360/69

OTHER PUBLICATIONS

IBM Technical Disclosure Bulletin, vol. 25, No. 2; M. B. Jordan, Jul. 1982 pp. 459, 460.

Primary Examiner—Raymond F. Cardillo
Assistant Examiner—David L. Robertson
Attorney, Agent, or Firm—Robert M. Wallace

[57] ABSTRACT

A peripheral memory controller controls a helical scan magnetic tape recorder so as to record and play back data files in parallel tracks on a magnetic tape. The tape is contained in a cassette having a magnetic disk fixably mounted on one reel of the cassette so that the movement of the tape and rotation of the disk are simultaneous. The peripheral memory controller refers to a file allocation table stored in one (or more) tracks on the disk, in order to correlate data file descriptions with track locations on the tape. A disk head rapidly scans the file allocation table disk track(s) within just one (or a few) revolutions of the disk while transmitting the contents of the table to the peripheral memory controller. The controller deduces therefrom the tape track location of a particular data file and commands the tape to be transported to that location in order to access that file. In another embodiment, sub-file allocation tables, each describing the tape track location of each sub-file within a given data file, are recorded in other disk tracks whose locations are recorded, in turn, in the file allocation table disk track. In order to take advantage of the co-movement of the tape and the disk, each sub-file allocation table stores the names of sub-files whose tape track locations fall within a length of tape covered during one rotation of the reel and disk, so that each sub-file allocation table disk track may be scanned completely while maintaining the position of the tape within the tape location range of the corresponding sub-file allocation table.

12 Claims, 10 Drawing Figures

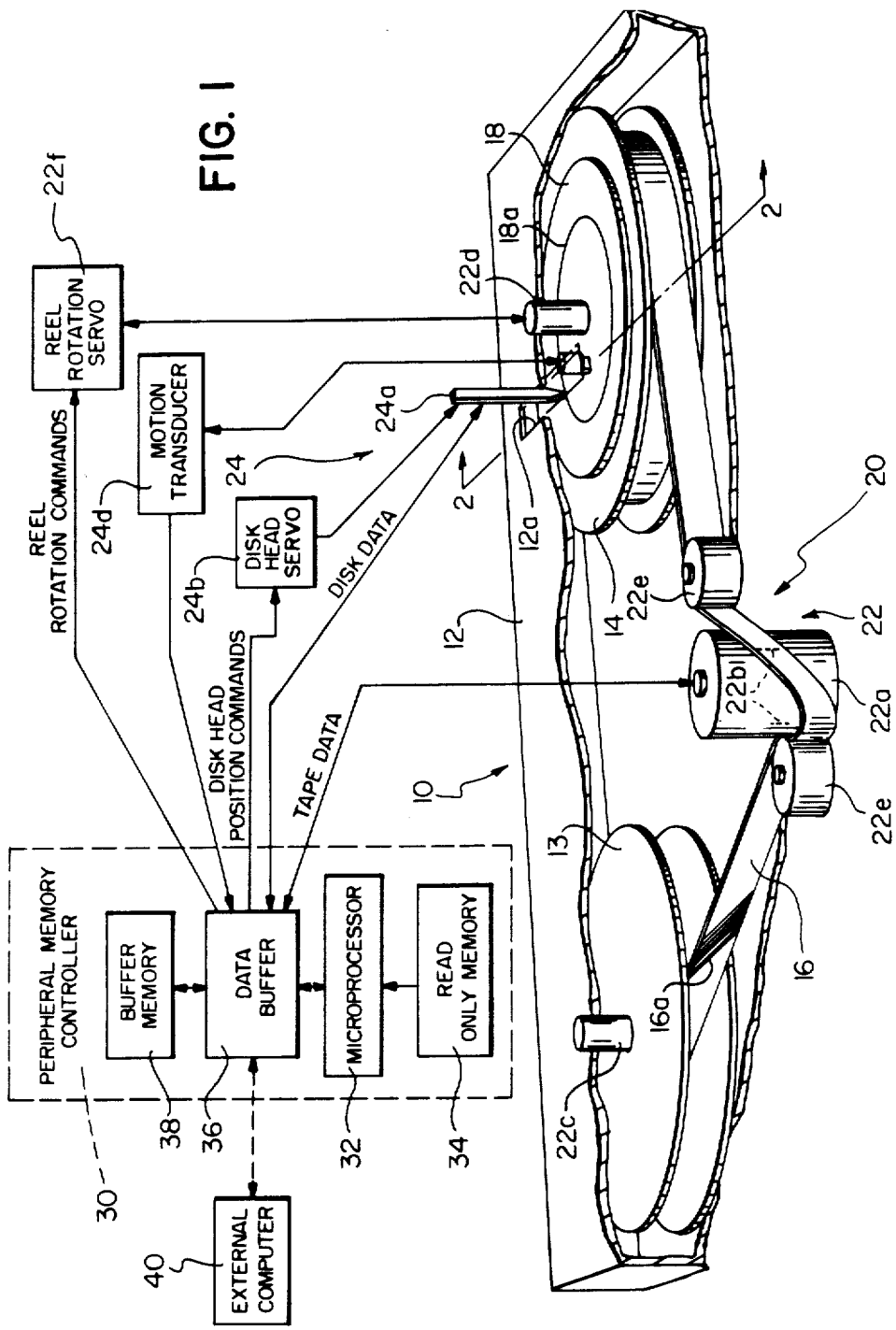

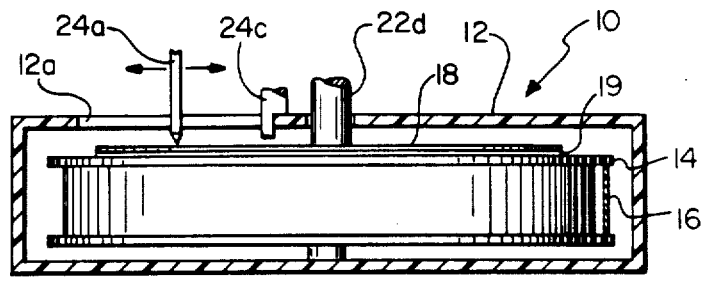
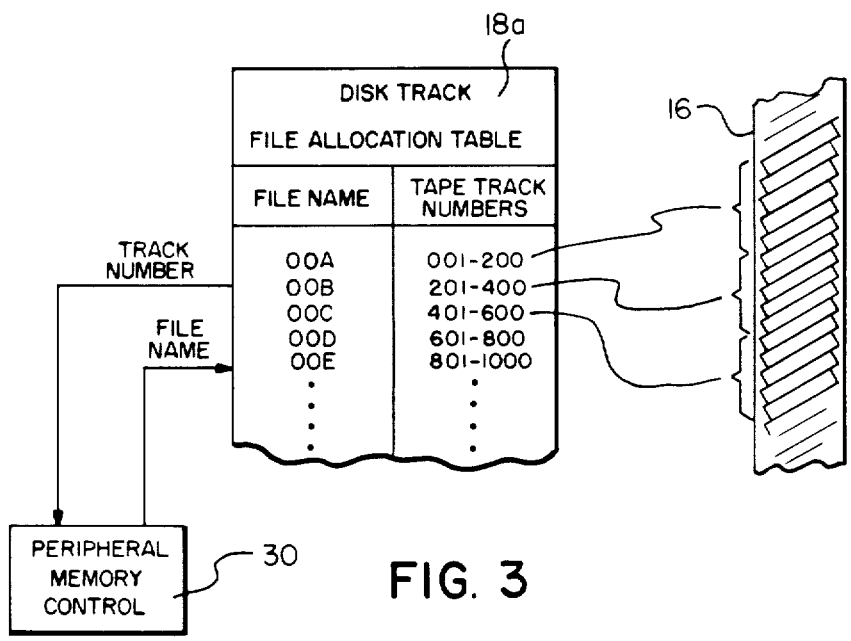
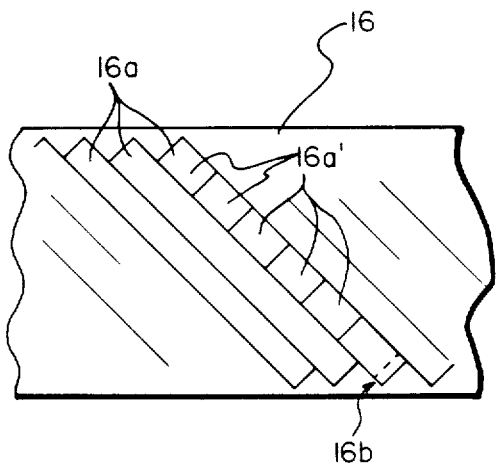

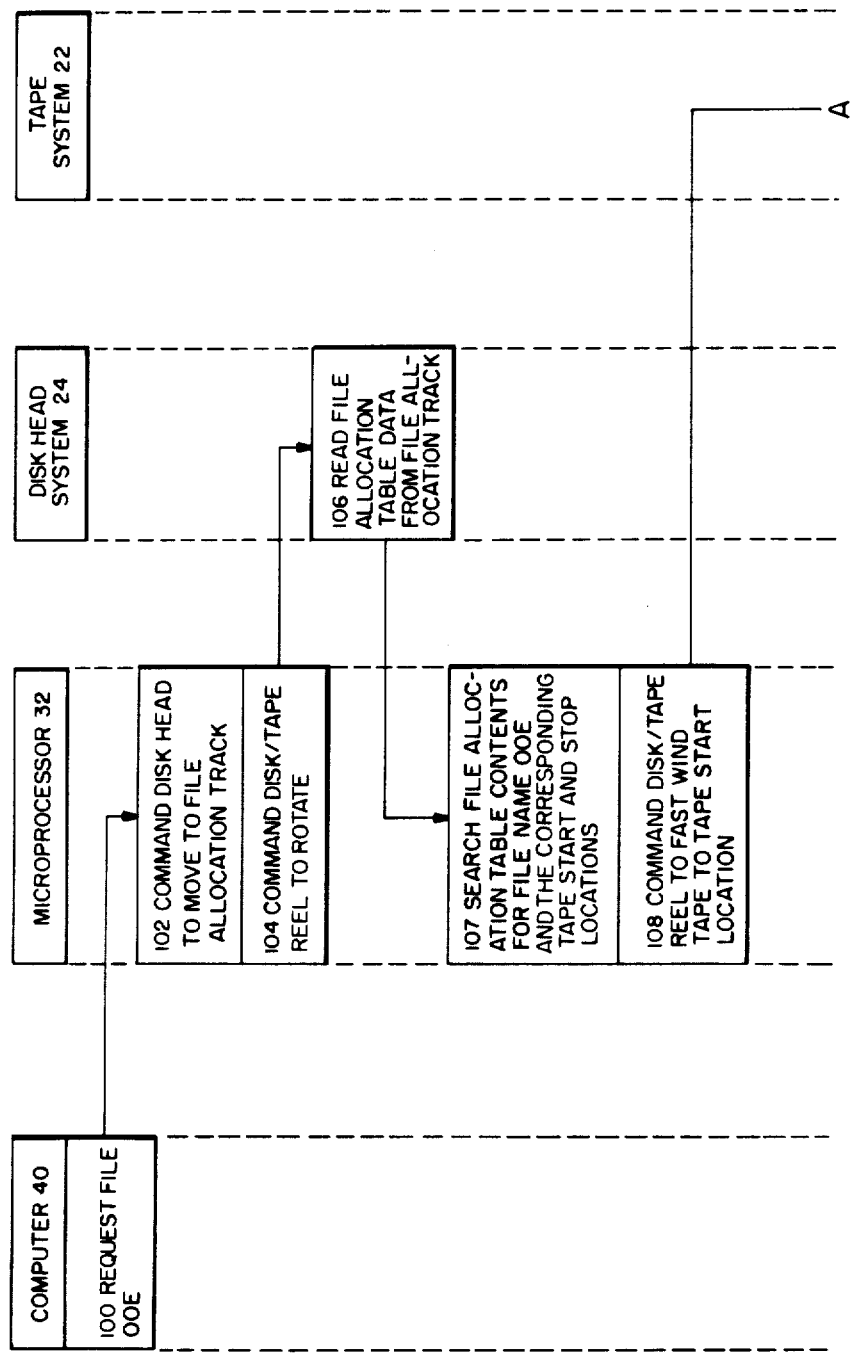

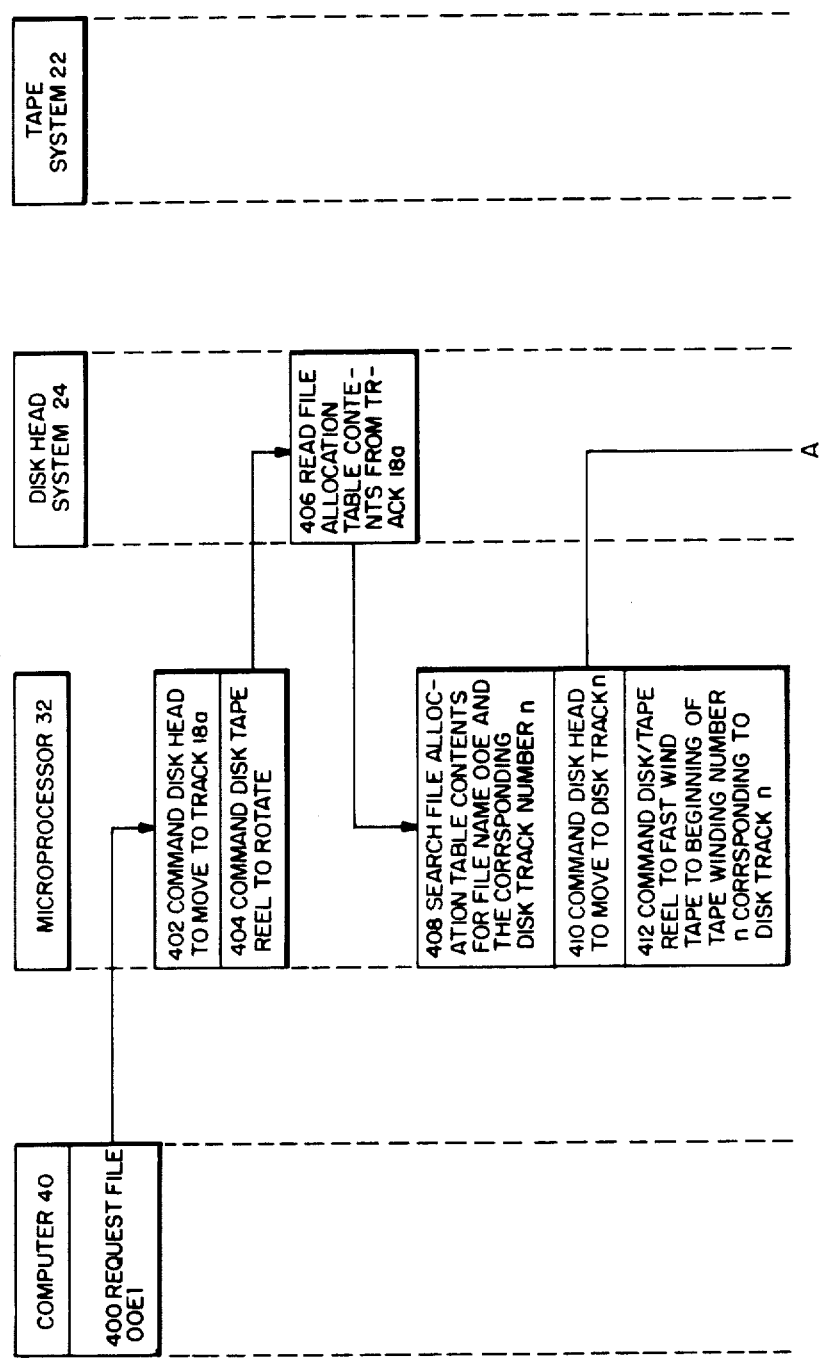

TAPE MEMORY WITH INTEGRAL DISK INDEX ON REEL

BACKGROUND OF THE INVENTION

1. Technical Field

The invention is related to helical scan tape cassette recorders such as video cassette recorders. The invention is also related to mass memories for computers. Mass memories typically store very large amounts of data (on the order of $10^{10}$ bits) and typically are realized as large and expensive tape storage systems, magnetic core systems or large disk drive systems.

2. Description of the Related Art

Mass Memories

Mass memories are an essential feature of the latest generation of very powerful high speed computers. Such a computer retrieves a block of data from the mass memory and stores it in a buffer memory for ready access to small or selected portions of the block of data. Whether realized in the form of magnetic cores, magnetic tape or disk systems or very large scale integrated circuits, mass memories suffer from being either bulky or expensive, or both. For example, it would require about one thousand $3\frac{1}{2}$ inch floppy disks to furnish the $10^{10}$ bit-capacity of a mass memory.

Video Cassette Recorders

In order to achieve high information density in magnetic tape recording of color video signals, a video cassette recorder (VCR) employs helical-scan recording techniques to record video signals at relatively slow tape speeds. For example, an 8 mm video cassette can record two hours of a video program. The problem is that accessing a particular portion or program recorded somewhere in the middle of the video tape length is time-consuming and may require several attempts before the tape is exactly positioned at the desired location. Thus, VCR's are not suitable for applications requiring quick access to small blocks of video programs or recorded information.

SUMMARY OF THE INVENTION

The cost and complexity of a mass memory is greatly reduced by realizing it as a helically scanned tape cassette recording system such as a VCR (of the type generally employed for video recording) in conjunction with a peripheral memory controller.

Problem

The problem solved by the invention is that retrieving a particular computer file or block of computer data stored somewhere in the middle of a two-hour VCR cassette is impractically slow, rendering the VCR tape storage system unsuitable for use as a mass memory for a high speed computer system. Specifically, there are no built-in byte-addresses on a video tape cassette, as there are, for example, in a random access memory (RAM) integrated circuit (IC). The X-Y address decoding system on a 256K-byte RAM IC, for example, provides byte access times on the order of nano-seconds. In contrast, trial and error searching through a two-hour video cassette on a VCR for a particular piece of information may take several seconds.

Solution to the Problem

In the apparatus embodying the present invention, computer data is recorded on a VCR tape cassette having a magnetic disk mounted co-axially on one reel of the tape cassette. Using helical scan techniques, the cassette can provide a $10^{10}$-bit recording capacity. The disk stores a file allocation table representing an outline of the contents of the cassette tape, thus facilitating a very fast outline review of the entire tape contents. The apparatus embodying the invention further includes a cassette record-playback system of the helical scan variety and a disk write/read head which can write on or read from the disk simultaneously with the helical scan recording system writing on or reading from the cassette tape.

An advantage is that a single drive mechanism provides both tape transport and disk rotation control. A single peripheral memory controller may control both disk and tape data addressing for simultaneously storing data on tape and entering data addresses in a file allocation table on the disk. The peripheral memory controller can determine tape locations of desired data by a very fast review of the file allocation table on the disk. For this purpose, the file allocation table is recorded on one (or a few tracks) of the disk, so that the peripheral memory controller can inspect the entire file allocation table through the disk read/write head within just one or a few rotations of the disk and tape reel.

After the desired tape location has been found in the file allocation table, the peripheral memory controller controls the rapid transporting of the tape to the desired location by tracking tape movement through the tape heads or tracking tape reel rotations through the disk read/write head or other well-known means, thus permitting very fine tape positioning control.

ALTERNATIVE EMBODIMENT

In an alternative embodiment of the invention, those remaining tracks on the disk which are not used to store the file allocation table are used to store sub-file allocation tables specifying the tape locations of sub-files comprised within a given data file. The advantage is that smaller blocks of data may be pinpointed for unloading from the tape. Preferably, each remaining disk track stores a sub-file allocation table covering those sub-files stored in a range of tape locations falling within a length of tape transported past the tape heads during one rotation of the tape reel and disk. This arrangement takes advantage of the co-rotation of the tape reel with the disk, thus permitting the disk read/write head to scan an entire sub-file allocation table for a particular sub-file description while the tape heads continue to be positioned within the corresponding range of tape locations containing all the sub-files listed in that table. This feature eliminates extra motion of the tape and disk and thereby shortens memory access times.

The invention provides what was previously unavailable, namely a relatively inexpensive mass memory suitable for use with a powerful computer. The invention is also useful as an add-on feature to endow a home VCR with the ability to quickly locate short video or audio programs previously recorded somewhere in the middle of a relatively long video tape by simply entering a computer without the usual trial and error wind and rewind operations normally associated with a home VCR. The invention may thus be used to combine home computer technology with home VCR technology to give the consumer a two-for-one device, namely a computer memory and video recorder system embodied in a single apparatus.

DESCRIPTION OF THE DRAWINGS

The invention may be understood by reference to the accompanying drawings, of which:

FIG. 1 is a simplified diagram of the apparatus of the present invention;

FIG. 2 is a cross-sectional diagram corresponding to FIG. 1;

FIG. 3 is a block diagram illustrating the architecture of the on-disk file allocation table;

FIG. 4 is a diagram of a section of the magentic tape, illustrating the recording of data files in parallel tracks;

DETAILED DESCRIPTION OF THE INVENTION

Overall System

Figure 5B:
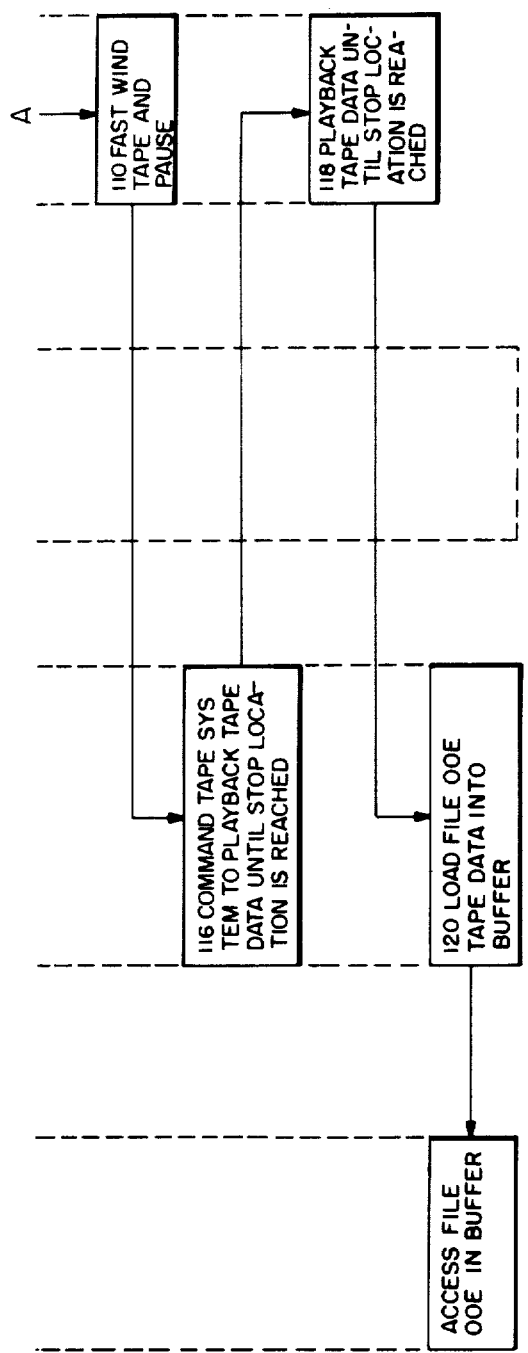
FIG. 5, consisting of 5A and 5B, is a flow chart illustrating the operation of the apparatus of FIG. 1.

Referring to FIGS. 1 and 2, a special tape cassette 10 similar to the Kodak PG-120 88 mm Video Cassette sold by Eastman Kodak Company, Rochester, N.Y., includes a plastic housing 12, tape reels 13, 14 and a magnetic tape 16 suitable for very high density recording in a plurality of parallel tracks 16a. The tape 16 is wound around the reels 13, 14 and the reel 14 is the take-up reel during recording and playback. The cassette 10 further includes a special magnetic storage disk 18 similar to the Kodak Hd600 is HD Micro Diskette sold by Eastman Kodak Company, but having a reduced disk diameter corresponding to the diameter of the video cassette reel 14 (typically about 1⅜ inch). The disk 18 is affixed to the reel 14 by a compliant adhesive material 19. The axis of the disk 18 is coaxial with the axis of the reel 14.

The apparatus of the invention further includes a helical scan cassette recorder (HSCR) 20. The HSCR 20 includes a tape recording system 22 similar to the Kodak MVS-5000 8 mm Audio-Video Recorder sold by Eastman Kodak Company. The tape recording system 22 includes a rotary head drum 22a, tape recording/playback heads 22b, reel drive shafts 22c, 22d, pinch rollers 22e and a reel rotation servo 22f controlling the reel drive shafts 22c, 22d. In the drawing of FIG. 1, the drive shaft 22d is the take-up drive shaft in the record and playback modes.

The HSCR 20 of the invention further includes a disk read/write system 24 including a disk read/write head 24a, a disk head servo 24b, a mechanical sense finger 24c and a motion transducer 24d. The cassette housing 12 has an opening 12a extending radially from the common axis of the take-up reel 14 and disk 18, permitting the read/write head 24a to contact the disk 18 through the housing 12 at any radial location on the top surface of the disk 18. The sense finger 24c is positioned to extend into the opening 12a whenever the cassette 10 is inserted into the HSCR 20. The motion transducer 24d senses movement of the finger 24c in order to distinguish between an ordinary VCR cassette and the cassette 10 of the present invention. The disk head servo 24b responds to commands to move the disk head 24a to any position along the radial length of the opening 12a in order to access any circular recorded track on the disk 18.

Peripheral Memory Controller

A peripheral memory controller 30 of the invention responds to a request from an external computer 40 (for example) for a particular data file by searching the disk 18 for information correlating the name of the requested data file to a particular physical location on the tape 16. The peripheral memory controller 30 then causes the tape 16 to be transported to the corresponding tape location. Once this location is reached, the data file is reproduced from the tape 16 through the heads 22b and is unloaded through the peripheral memory controller 30 to the computer 40.

The peripheral memory controller 30 includes a microprocessor 32. A read only memory (ROM) 34 stores the set of program instructions executed by the microprocessor 32 to implement the various functions of the peripheral memory controller 30. Data is transmitted through a data buffer 36 between the peripheral memory controller 30 and the tape heads 22b, the disk head 24a, the reel rotation servo 22f, the disk head servo 24b and the sense finger motion transducer 24d. A buffer memory 38 stores data files which are played back from the tape 16, or which are to be recorded onto the tape 16.

If the computer 40 transmits a data file, characterized by a particular file name, to the peripheral memory controller 30 for storage on the tape 16, the data file and name are received by the data buffer 36 and temporarily stored in the buffer memory 38. The microprocessor 32 causes the file name and a selected tape track number (or numbers) to be transmitted through the data buffer 38 to the disk head 24a for recording on the disk 18. The microprocessor also causes the data file to be unloaded from the buffer memory 38 and transmitted to the tape heads 22b for recording on the tape 16 at the selected tape track (or tracks). For this purpose, the microprocessor 32 issues appropriate commands to the reel rotation servo (in order to rotate the disk 18 and transport the tape 16) and to the disk head servo 24b (in order to radially move the disk head 24a to overlie the proper disk track).

The data buffer 36 may include means for converting digital commands issued by the microprocessor 32 to analog signals for transmission to the reel rotation servo and the disk head servo, and for converting digital data unloaded from the buffer memory 38 into a suitably encoded form (such as pulse code modulation) for recording on the tape 16, in accordance with well known principles. The microprocessor 32 relies on feedback from the reel rotation servo or data picked up by the tape heads 22b or the disk head 24a, as the tape 16 is being rapidly transported to a selected position, in order to deduce the changes in tape position and appropriately modify the commands issued to the reel rotation servo 22f, in accordance with principles well known in the art.

File Allocation Table Architecture

The data file names and their corresponding tape track numbers are recorded in one (or several) circular track(s) 18a on the disk 18 in a file allocation table of the type illustrated in FIG. 3. Each data file furnished by the computer 40 to the peripheral memory controller 30 is associated with a file name such as 00A, 00B, etc. According to the file allocation table of FIG. 3, data file 00A is recorded on tape tracks 001 through 200, data file 00B is recorded on tape tracks 201 through 400, etc.

The entire file allocation table of FIG. 3 preferably is recorded in the one (or several) disk track(s) 18a so that the peripheral memory controller 30 can respond to a later request from the computer 40 for a particular data file by scanning the entire file allocation table within just one (or a few) revolution(s) of the disk 18, for a nearly instantaneous determination of the corresponding tape location.

Referring in FIG. 4, in cases where a particular data file occupies several of the parallel tape tracks 16a which are not necessarily adjacent or in any particular order, a set of pointer bits 16b is inserted at the end of the respective track to notify the peripheral memory controller 30 to transport the tape 16 to another particular track (instead of the next succeeding track) in order to continue reading the particular data file without interruption.

File Addressing Operation

The flow chart of FIG. 5 illustrates the operation of the microprocessor 32 in response to a request from the computer 40 to access a data file named "00E" previously stored on the magnetic tape 16. A request 100 for file 00E is received in the data buffer 36 and sensed by the microprocessor 32. The microprocessor 32 issues a command 102 to the disk head servo 24b to position the disk head 24a over the file allocation track 18a. Then, the microprocessor 32 issues a command 104 to the reel rotation servo 22f to rotate the reel 14, thereby rotating the disk 18 so that the disk head 24a scans the disk track 18a to pick up the data 106 representing the file allocation table. The microprocessor 32 then makes a search 107 of the file allocation table contents for the file name 00E and the corresponding tape start and stop locations, and issues a command 108 to the reel rotation servo 22f to transport the tape 16 to the corresponding start location. In example of FIG. 3, the tape start location for file 00E is the 801 st tape track and the stop location is the 1000 th tape track. The reel rotation servo 22f fast winds the tape 16 until tape track 800 faces the rotary head drum 22a (block 110 of FIG. 5). Once the desired tape start location is reached, the microprocessor 32 issues a command 116 to the reel rotation servo 22f to transport the tape 16 at playback speed until desired stop location (track 1000) is reached (block 118). Meanwhile, the microprocessor 32 issues a command 120 enabling the data buffer 36 to receive data picked up by the tape heads 22b and to load it into the buffer memory 38. Thereafter, the computer 40 is free to search through the buffer memory 38 to access any portion of file 00E and to either read data from it or write data into it.

MEMORY CAPACITY

One two-hour 8 mm video cassette is capable of storing roughly $10^9$ bytes of computer data using the method for recording pulse code modulated (PCM) audio signals in the 8 mm industry standard format. One track on a typical micro-floppy disk stores roughly $10^3$ bytes. If the entire contents of the two-hour tape cassette is to be divided into plural files, each of which is described in the file allocation table by two descriptive bytes, and if all descriptive bytes are to fit together within the file allocation disk track 18a, then the total number of files is limited to about $10^3$, so that the average size of each file must be on the order of $10^6$ bits. Such a large file may, in some applications, prove unwieldy. Accordingly, it may be desirable to access smaller sub-files within each file. The following alternative embodiment of the invention accommodates this need.

Sub-file Architecture

Figure 6:
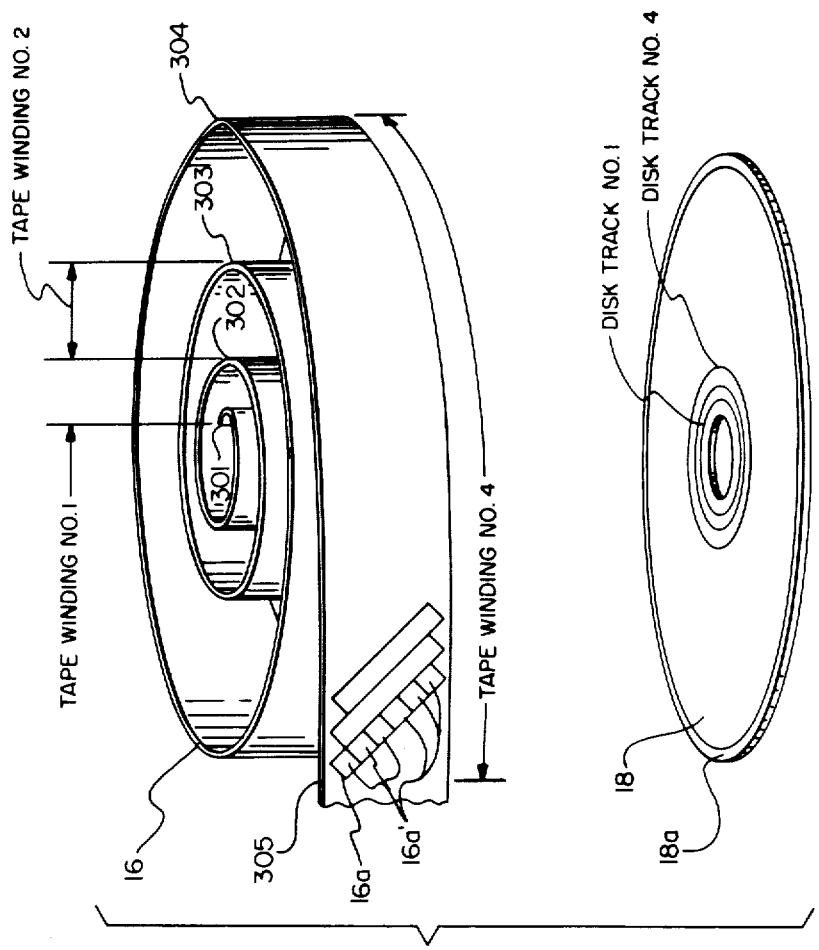
FIG. 6 is a simplified perspective view of the disk and corresponding magnetic tape, illustrating the preferred arrangement of sub-file allocation tables and corresponding tape locations in another embodiment of the invention.
Figure 7:
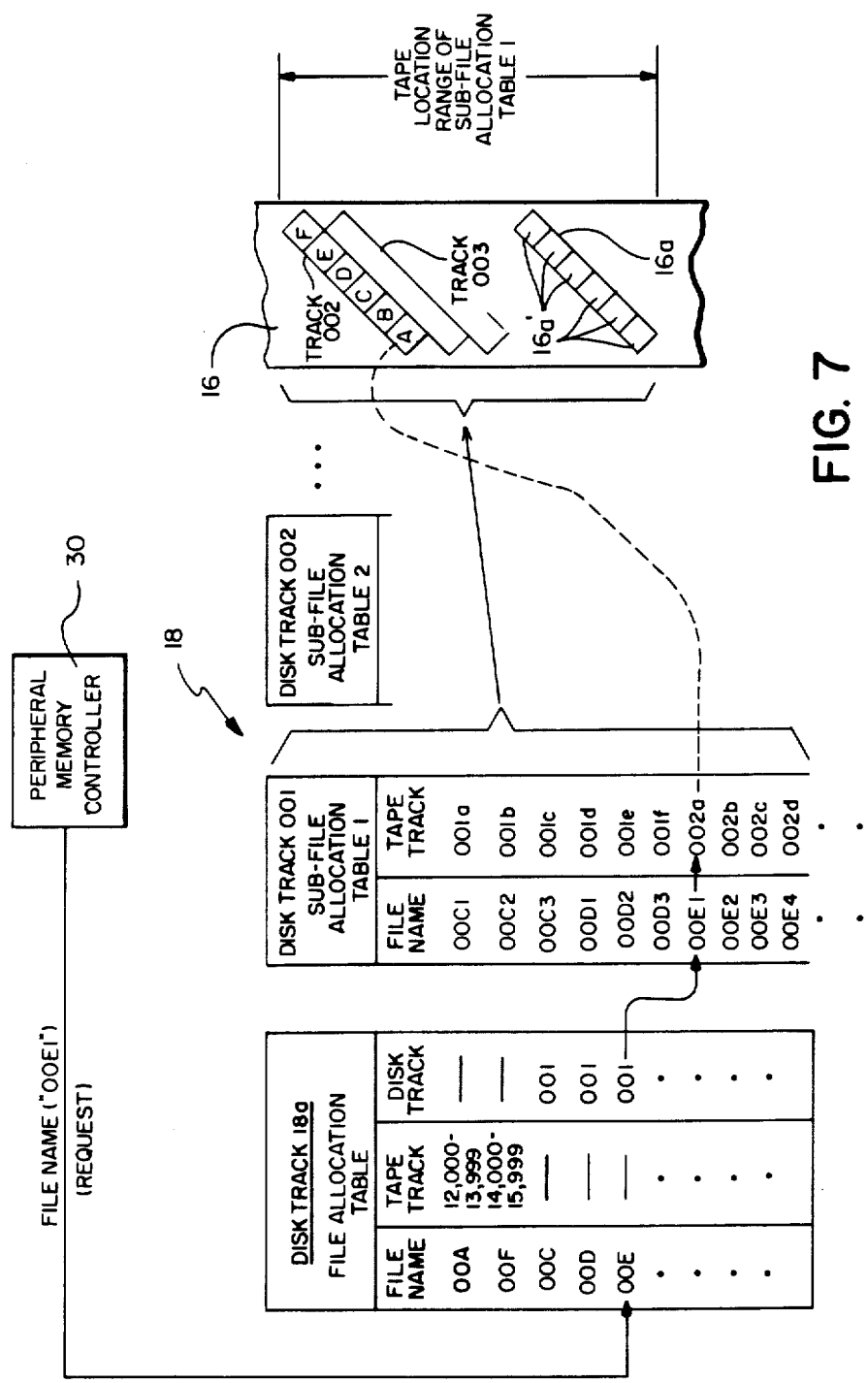
FIG. 7 is a block diagram illustrating the architecture of file and sub-file allocation tables in the embodiment of FIG. 6.

Storing the entire file allocation table (of FIG. 3) in the file allocation disk track(s) 18a leaves all of the other tracks on the disk 18 unused. In the alternative embodiment of FIG. 6, the remaining tracks are used to store sub-file allocation tables describing tape locations of plural sub-files comprised within one (or more) of the files listed in the general file allocation table of the disk track 18a. The memory architecture of the embodiment of FIG. 6 is illustrated in FIG. 7. The file allocation track 18a stores a file allocation table listing, by file name, the corresponding tape track numbers and disk track numbers. In FIG. 7, some of the files (for example files 00A and 00F) are not divided into sub-files. For these, the file allocation table of FIG. 7 lists only a corresponding tape track number range. Other files however, (files 00C, 00D, 00E, for example) are divided into sub-files. For these, the file allocation table of FIG. 7 lists the location of a corresponding one of the remaining disk tracks where the corresponding sub-file allocation table is located.

In the example of FIG. 7, the computer 40 requests sub-file 00E1, and the file allocation table on the disk track 18a directs the peripheral memory controller 30 to another disk track, namely, disk track 1 containing sub-file allocation table 1. Sub-file allocation table 1 lists the various tape locations of the sub-files of files 00C, 00D, 00E. The tape location of sub-file 00E1 is tape track 2 sub-track A, i.e. tape track 002A, according to sub-file allocation table 1. Therefore, the peripheral memory controller 30 causes the tape to be moved to track 002A in order to access sub-file 00E1.

In the example of FIG. 7, each file corresponds to one parallel track 16a on the tape 16 and each sub-file corresponds to one of six sub-tracks 16a' within the track 16a. Of course, other arrangements of the sub-files may be selected in implementing the invention.

PROGRESSIVE RADIAL LOCATIONS OF SUB-FILE ALLOCATION TABLES

Each sub-file allocation table occupies its own particular one of the tracks on the disk 18, and is assigned a range of tape locations corresponding to one rotation of the tape reel 14 and corresponding to the storage capacity of the particular disk track. In the embodiment of FIG. 6, the linear bit density of all tracks on the disk 18 is the same, so that the storage capacity of each disk track is proportional to its radius. Similarly, the storage capacity of each winding of the tape 16 around the tape reel 14 is proportional to its radius. Each sub-file allocation table covers a range of tape locations corresponding to a particular winding of tape 16 around the tape reel 14, the radial locations of the tape winding and of the corresponding disk track being proportional to one another. Thus, the section of the tape 16 beginning at point 301 and ending at point 302, constituting one of the innermost windings of the tape 16 around the take-up reel 14, is covered by a sub-file allocation table stored on one of the innermost tracks on the disk 18, such as disk track 1. Outermost windings of the tape 16 about the take-up reel 14 have their sub-file allocation tables stored in correspondingly outermost ones of the disk tracks on the disk 18. For example, the sub-file allocation table listing all the sub-files stored within the section of the tape 16 beginning at point 304 and ending at point 305 (constituting the fourth tape winding on the take-up reel 14) is recorded on the fourth disk track (disk track number 4). Thus, the capacity of each sub-file allocation table stored on the disk 18 is proportional to the range of tape locations it covers.

Many variations on this arrangement may be effected in implementing the invention. However, the central feature of the embodiment of FIG. 6 is that, once the tape has been positioned to play back a given group of sub-files within a given file, just one (or a few) rotation(s) of the take-up reel 14 permits scanning the entirety of the corresponding sub-file allocation table on the disk 18 while the tape location facing the tape heads 22b remains within the tape location range covered by that sub-file allocation table. This is eminently convenient and time-saving because the peripheral memory controller 30 may hunt for various sub-files, one after another, within a given sub-file allocation table without transporting the tape 16 beyond the tape location range of the table, thus permitting many different sub-files within a given file to be accessed in rapid succession with a minimum of tape movement.

SUB-FILE ADDRESSING OPERATION

Figure 8B:
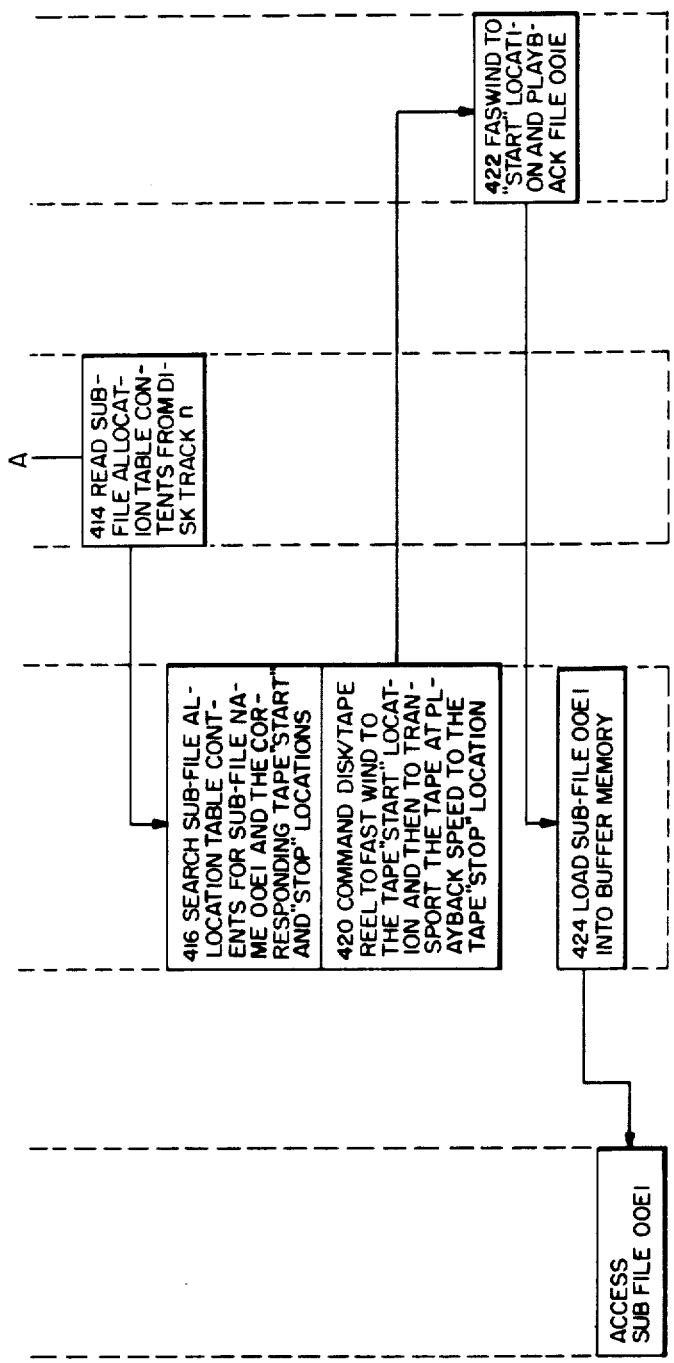
FIG. 8, consisting of 8A and 8B, is a flow chart illustrating the operation of the embodiment of FIG. 6.

Operation of the microprocessor 32 in the embodiment of FIG. 6 is illustrated in the flow chart of FIG. 8. The computer 40 issues a request 400 for sub-file 00E1. The microprocessor 32, in response to the request 400 issues a command 402 for the disk head 24a to move to the radial location of the file allocation track 18a. It also issues a command 404 for the disk to rotate. As a result, the contents of the file allocation table are transmitted to the data buffer 36 (block 406 of FIG. 8). The microprocessor 32 searches the file allocation table contents for the sub-file name 00E1 and the corresponding disk track number (block 408 in FIG. 8). The microprocessor 32 deduces from the table that the desired disk track is disk track 1, and issues a command 410 to move the disk head 24a to the radial location of disk track 1. The microprocessor 32 issues a command 412 to transport the tape 16 until the portion of the tape 16 assigned to disk track 1 (i.e., winding No. 1 of the tape 16 in the preferred embodiment) is adjacent the rotary head drum 22a. In the meantime, sub-file allocation table 1 stored on disk track 1 is loaded into the data buffer 36 (block 414 of FIG. 8). The microprocessor 32 searches through the contents of disk track 1 for the tape location of sub-file 00E1 (block 416). In the example of FIG. 7, the tape location of sub-file 00E1 is tape track 002A, according to sub-file allocation table 1. The microprocessor 32 issues a command 420 to transport the tape 16 to track 002A, causing the tape 16 to move the small distance between the beginning of tape winding 1 and track 002A (block 422 of FIG. 8). Thereafter, the data recorded in tape track 002A is played back as the microprocessor 32 issues a command 424 enabling the data buffer 36 to load the received tape data into the buffer memory 38 for use by the computer 40.

While the invention has been described in detail with particular reference to preferred embodiments thereof, it is understood that variations and modifications thereof may be made within the spirit and scope of the invention.

What is claimed is:

1. A mass memory useful with an external host computer whereby said external host computer may store in and retrieve from said memory large quantites of data, said memory comprising:

(I) an insertable cassette, comprising:
  (a) at least one tape reel,
  (b) a length of magnetic tape windable around said reel,
  (c) a rotary storage disk mounted concentrically over said one tape reel and being rotatable therewith;

(II) a helical scan cassette recorder adaptable to receive said insertable cassette, said recorder comprising:
  (a) first means for recording onto said tape, and playing back from said tape, blocks of information,
  (b) second means for recording data onto, and playing back data from said disk,
  (c) means for rotating said reel so as to transport said tape and rotate said disk, (III) peripheral memory controller means connectable to said external host computer, said controller means for:
  (a) accepting a command from said host computer, said command being either a retrieve command or a store command, said command containing at least the name of a selected one of said information blocks,
  (b) whenever said command is a store command, causing said second means to write the name of said selected one of said information blocks, together with data relative to a corresponding location on said tape, in at least an arcuate track on said disk, and receiving data comprising said selected information block from said host computer and causing said first means to record said data comprising said selected information block on said tape at said corresponding tape location;
  (c) whenever said command is a read command, inspecting through said second means the data stored in a least said arcuate track on said disk, and deducing therefrom the corresponding tape location of said selected information block, causing said means for rotating to transport said tape to said corresponding tape location, and causing said first means to begin playing back the data stored at said corresponding tape location.

2. The system of claim 1 wherein said arcuate disk track contains the names of all of said information blocks recorded on said tape and their corresponding tape locations, whereby said control means reads all of said information block names and corresponding tape locations within one revolution and of said reel.

3. The system of claim 1 wherein:
the information recorded on said one arcuate track comprises a file allocation table which correlates names of selected ones of said information blocks with other tracks on said disk;
said second means is further adaptable to record and playback, in said other disk tracks, sub-file allocation tables correlating portions of said blocks of information with corresponding portions of said tape locations, whereby said control means is responsive to an external request for a particular portion of said information blocks, to scan said one disk track so as to deduce the location of the corresponding one of said other disk tracks, and to scan said one other disk track so as to deduce the corresponding tape location portion, and to cause said rotating means to transport said tape until said corresponding tape location portion is adjacent said drum.

4. The system of claim 3 further comprising means for sensing the presence of said disk on said reel and for enabling said control means whenever said disk is so present.

5. The system of claim 3 wherein said second means is adaptable to store names and tape locations of said information blocks in said one disk track and to store names and tape locations of said information block portions in all remaining tracks on said disk.

6. The system of claim 3 wherein at least one of said other disk tracks is characterized by a range of tape sub-locations stored thereon, said tape sub-location range falling within a length of said tape corresponding to one rotation of said disk, whereby said control means scans said other disk track while said drum continues to remain adjacent physical locations on said tape falling within said range.

7. The system of claim 6 wherein said second means is adaptable to store respective ranges of tape locations in respective disk tracks corresponding to single rotations of said tape reel, and wherein the storage capacity of each of said disk tracks is proportional to its radius, whereby innermost ones of said other disk tracks are characterized by ranges of tape locations of corresponding innermost windings of said tape around said reel, and outermost ones of said other disk tracks are characterized by ranges of said tape locations of corresponding outermost windings of said tape around said reel.

8. The system of claim 1 further comprising an adhesive layer disposed between said rotary storage disk and said one tape reel whereby said disk and said reel are fixably co-rotatable with one another.

9. A mass memory connectable to an external host computer whereby said external host computer may store in and retrieve from said mass memory large quantities of data, said mass memory comprising:

a take-up reel adapted to wind a length of magnetic tape;

a helical-scan rotating head drum adapted to contact said magnetic tape and record thereon and playback therefrom information blocks in respective locations on said tape;

an information-storing disk concentrically mounted on said take-up reel;

a memory controller connected to receive read commands and write commands from said host computer, said memory controller adapted to facilitate the storage or retrieval of an information block selected by said host computer to or from said mass memory, respectively, said memory controller comprising means for:

(1) whenever a write command is received from said host computer, writing the name of the selected information block together with data relative to a corresponding tape location in at least one arcuate track on said disk, receiving said selected data block from said host computer and causing it to be recorded on said tape at said corresponding tape location;

(2) whenever a read command is received from said host computer, inspecting the contents of at least to said corresponding tape location, causing said head drum to play back therefrom said selected information block, and transmitting said selected information block to said host computer.

10. The system of claim 9 wherein said controller means records sub-names of information sub-blocks comprised within a given one of said information blocks, together with corresponding sub-locations on said tape falling within a tape location range, in other arcuate disk tracks separate from said one arcuate disk track.

11. The system of claim 10 wherein said controller means records in said one arcuate disk track the disk locations of said other disk tracks together with the corresponding ones of said information block names.

12. The system of claim 10 wherein said tape location range corresponds to one revolution of said tape reel, whereby the entirety of said one other disk track may be searched for any tape location within said tape location range while said drum remains adjacent said tape location range.

* * * * *

UNITED STATES PATENT OFFICE
CERTIFICATE OF CORRECTION

PATENT NO. : 4,723,181
DATED : February 2, 1988
INVENTOR(S) : William K. Hickok

It is certified that error appears in the above-identified patent and that said Letters Patent are hereby corrected as shown below:

Column 10, line 22    between "least" and "to", the following should be inserted: --said one arcuate disk track and deducing therefrom the corresponding tape location of said selected information block, causing said tape to be transported--.

Signed and Sealed this

Twenty-eighth Day of June, 1988

Attest:

DONALD J. QUIGG

Attesting Officer    Commissioner of Patents and Trademarks